(No Model.)
G. D. SUTTON.
CONDUIT FOR ELECTRIC WIRES.
No. 355,798. Patented Jan. 11, 1887.
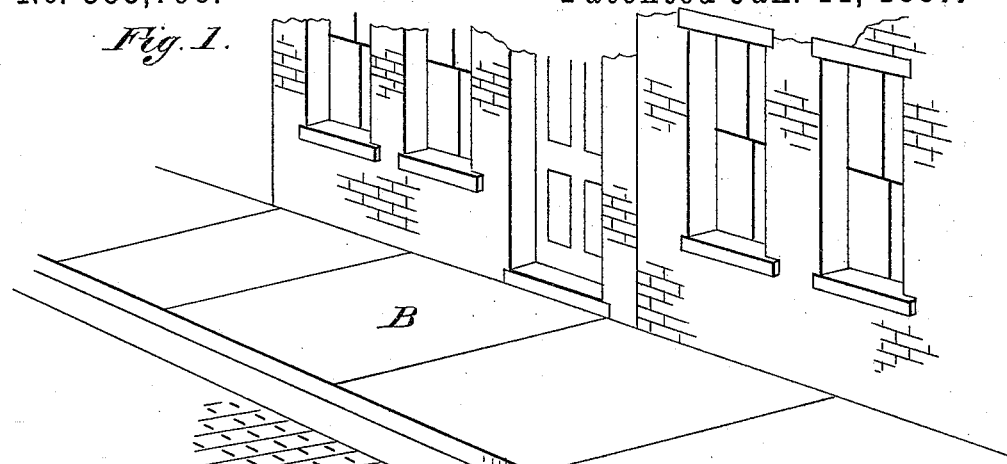
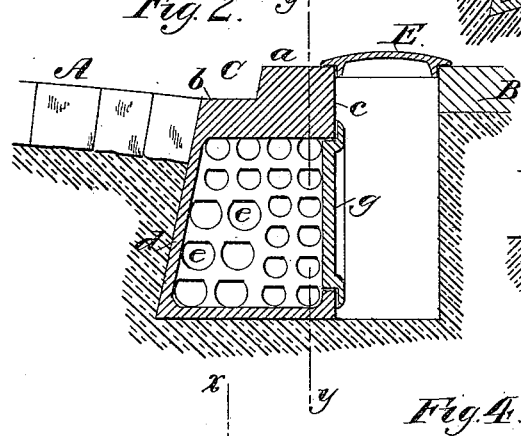
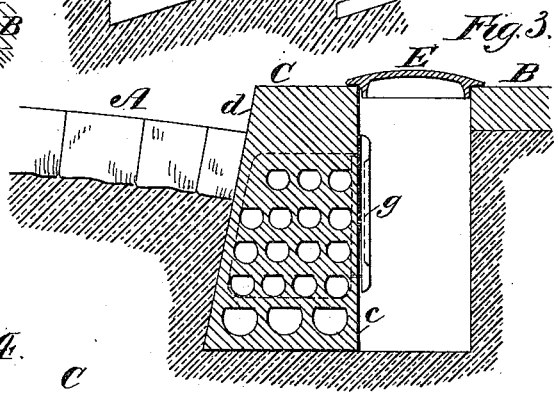
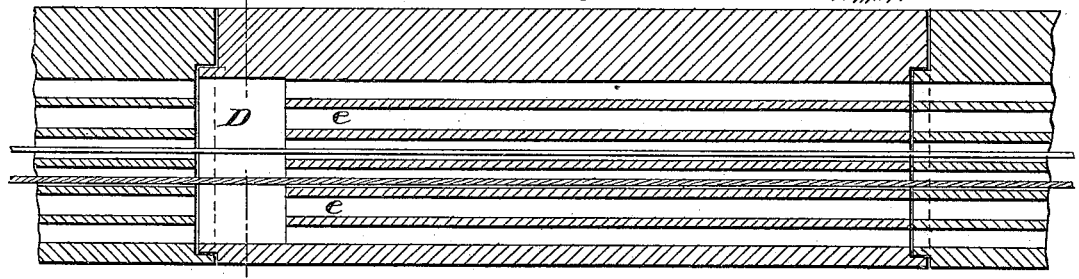
WITNESSES:
R. N. R. Phelps.
W. E. Bowen.
INVENTOR
George D. Sutton,
BY J. E. M. Bowen
ATTORNEY

UNITED STATES PATENT OFFICE.

GEORGE D. SUTTON, OF NEW YORK, N. Y., ASSIGNOR TO GEORGE D. SUTTON, JR., OF SAME PLACE.

CONDUIT FOR ELECTRIC WIRES.

SPECIFICATION forming part of Letters Patent No. 355,798, dated January 11, 1887.

Application filed February 23, 1886. Serial No. 192,806. (No model.)

*To all whom it may concern:*

Be it known that I, GEORGE D. SUTTON, a citizen of the United States, and a resident of New York, in the county of New York and State of New York, have invented certain new and useful Improvements in Conduits for Electric Wires, of which the following is a specification.

This invention relates to conduits for the accommodation underground of electric wires, and is designed particularly for the electric-wire service of cities and towns.

The object of the invention is to provide means whereby the various wires of electric light, telephonic, telegraphic, burglar-alarm, fire-alarm, and fire-extinguishing systems may be practically and satisfactorily placed beneath the surface of the ground.

My invention avoids the necessity of materially interfering with the carriage-ways of streets in its introduction, and when once put down all repairs, connections, and the like may be carried on without disturbing the conduit system or the streets or sidewalks beneath or through which the system may pass.

My invention furnishes a practicable means of consolidating all the wires of the various electric systems under one management, and in point of economy my invention is much superior to those systems which contemplate the laying of pipes or tunnels under the carriage-ways or sidewalks, and which can only be reached for repairs, enlargement, or lateral connections by expensive and annoying excavations.

The invention consists in a conduit of peculiar form, preferably molded in artificial stone, and provided, in the act of molding, with a series of flues of semicircular or trough-like form.

The invention further consists in certain combinations, hereinafter specified.

My conduit is intended to be located at the sides of streets, and may replace the ordinary stone curb, and when thus employed its top surface may be in two planes, the lower plane extending out to the gutter-line, so as to provide both a curb and gutter. In cases where the flagging of the sidewalk extends out to the curb-line and curbstones are dispensed with, as is the case in many of the large cities, the top surface of my conduit will be flat or in a single plane, and of sufficient width to enable a portion thereof to extend beneath the outer edge of the flagging, and yet provide sufficient width outside of the outer edge of the flagging to serve as a gutter.

In the accompanying drawings, which form a part of this specification, and in which like figures indicate like parts, Figure 1 is a view in perspective, partly in section, of a part of a street, showing the sidewalk of flagging, the vault beneath the sidewalk, and the form of my conduit and its location with reference to the vault and sidewalk. Fig. 2 is a cross-section, through the line $xx$ of Fig. 4, of the form of conduit with a top surface designed to serve as a combined curb and gutter, said view showing the relative locations of the conduit, carriage-way, and sidewalk. Fig. 3 is a similar view of the form of conduit adapted to replace the ordinary curbing of a street, the relative location of carriage-way and sidewalk being shown as in Fig. 2. In both of these views, Figs. 2 and 3, the cross-section is taken through the conduit at the point where it is provided with the opening in its inner wall, whereby entrance is afforded through a man-hole, as hereinafter explained. Fig. 4 is a longitudinal vertical section through the line $yy$ of Fig. 2.

In the drawings, A represents the carriage-way of a street, and B the sidewalk.

C indicates my conduit, which, by preference, will be molded in artificial stone, but may be composed of any other suitable material. It may be twenty inches deep, (more or less,) according to the requirements of the service for which it is intended, and of a width at top sufficient to cover the surface now usually occupied by the stone curb or the space occupied by curb and gutter, or even of greater width, if found desirable and practicable. These dimensions will of course be subject to city and town regulations, and do not concern the merits of my invention.

When the form of conduit shown in Fig. 3 is employed, it will occupy the same relation to the carriage-way and sidewalk that the solid stone curbs now occupy, extending somewhat above the surface of the carriage-way, but being substantially on a level with the sidewalk.

When the form of conduit shown in Fig. 2 is employed, the higher plane, *a*, of its top surface serves as a curb, and the lower plane, *b*, as a gutter, as is plain from an inspection of the drawings.

The conduit shown in Fig. 1 is of a form adapting it for use where the sidewalks are composed of flagging which extends out to the curb-line and curbstones are dispensed with. In this case the top surface of the conduit is of sufficient width to enable a portion thereof to be placed beneath the outer edge of the flagging, and at the same time leave enough exposed to afford a substantial gutter-surface, as shown by the drawings.

In the several forms of conduits shown the rear wall, *c*, is perpendicular, while the front wall, *d*, is inclined from the top downward. In practice the inclination of wall *d* will be such as to provide a width of about four inches at the bottom, more or less, than at the top; but I do not confine myself to any exact proportions. The advantage of this form of structure is that increased capacity is afforded without lessening the strength. The pressure of the carriage-way upon the inclined wall *d* will have no tendency to rupture the structure, as might be the case if the wall *d* were curved, for instance, and the paving-blocks rested on the joint of the curve. Another advantage of the inclined front wall is that the wheels of vehicles will not be so liable to come in contact with that part of the structure which serves as a curb.

The conduit will be molded in sections of any practicable length, and the sections joined by any suitable method. As shown in Fig. 4, the joint is an ordinary pipe-joint, which is both cheap and efficient. When the sections are put together, the joints are made water and moisture tight by a suitable cement.

I mold the conduit-sections of the several forms shown with a series of flues, *e*, preferably of semicircular or trough-like shape. Some of these flues, near the base or next to the front or outer wall of the structure, may be made considerably larger than the others for the accommodation of specially larger cables or conductors. Certain of the conduit-sections, and if need be all of them, will be provided at some point in their length, preferably at one end, with a vacant space, D, into which access is had through an opening, *f*, in the back wall of the section, as shown. The opening *f* will be covered by a slab of stone or of other material, *g*. The purpose of the space D and opening *f* is to enable lateral connections to be made between the wires within the conduit and buildings along the route traversed by the conduit. Where the curb and curb-and-gutter conduit are employed, man-holes E will be placed in the sidewalk directly over and in line with the openings *f* in the rear walls of the conduit-sections. It may be desirable to place the man-holes about fifty feet apart, as by this plan the wire-connections for two buildings of ordinary width may be made through a single man-hole; but the number of man-holes necessary for a mile or more of conduit will depend upon circumstances, and no arbitrary rule can be laid down to serve in all cases.

In Fig. 1 the conduit C is shown located along the gutter-line of a street, with a portion of its top surface beneath the outer edge of the flagging of the sidewalk. This plan will be found very desirable where there are vaults beneath the sidewalks, as the inner wall of the conduit can form a part of the front wall of the vaults, and ready access into the spaces D of the conduit-sections can be had through the vaults. By this means lateral connections between the wires within the conduit and the buildings can be expeditiously and inexpensively made without the necessity of providing outside man-holes in the sidewalks.

In using these forms of conduits it is my purpose to draw the wires and cables through the trough-shaped flues *e*, which may be done by any of the well-known appliances employed for such work. The wires and cables are thus effectively separated one from another, thereby avoiding all objection to the plans of underground wire-service, which contemplate locating the wires for various services in one tube or compartment. The wires and cables will be properly insulated of course; but when effectually isolated one from another within the flues of my non-conducting stone conduit there is no liability of any trouble from induction.

At street corners the conduit-sections may be joined at a right angle, or in any other convenient manner.

In crossing intersecting streets the top surface of the conduit-sections will be formed to correspond to the surface of the carriage-ways, and suitable man-holes may be arranged for communicating with such street-sections, if found desirable.

Those portions of the wires and cables which pass through the spaces D may be specially protected by insulating material, and by an armor of lead or the like.

Having thus described my invention, what I claim as new, and desire to secure by Letters Patent, is—

1. A conduit for underground electric-wire service having an inclined front wall, and its interior provided with a series of semicircular or trough-shaped flues, the whole molded in artificial stone or any suitable material, substantially as set forth.

2. An underground conduit-section molded in artificial stone or any suitable material, and provided with a series of interior flues and a vacant space at one point of its length and lateral means of access thereto, in combination with a man-hole adjacent to said opening in the conduit, substantially as set forth.

3. An underground conduit provided with a series of flues and with an unoccupied space at some point of its length, and with lateral means of access into said unoccupied space, in combination with vaults under the sidewalks, substantially as set forth.

Signed at New York, in the county of New York and State of New York, this 17th day of February, A. D. 1886.

GEO. D. SUTTON.

Witnesses:
J. E. M. BOWEN,
HUGO KOELKER.